UNITED STATES PATENT OFFICE.

THOMAS G. BLACKLOCK, OF BROOKLYN, NEW YORK, ASSIGNOR TO BLACKLOCK MILLING COMPANY, INCORPORATED, A CORPORATION OF NEW YORK.

BAKER'S MIXTURE.

1,210,588.      Specification of Letters Patent.      Patented Jan. 2, 1917.

No Drawing.      Application filed October 7, 1916. Serial No. 124,293.

*To all whom it may concern:*

Be it known that I, THOMAS G. BLACKLOCK, a citizen of the United States, and a resident of the borough of Brooklyn, city of New York, county of Kings, and State of New York, have invented a new and useful Improvement in Bakers' Mixtures, of which the following is a specification.

One object of my invention is to provide a novel combination of ingredients particularly adapted either for domestic or baker's use for the purpose of rendering possible the employment of a larger quantity of water with a given weight of flour in the preparation of bread or other dough, than has hitherto been possible without slackening; it being also desired that a given weight of the dough shall occupy a larger volume than has previously been the case and which in addition shall remain in a fresh, moist and palatable condition for a prolonged period of time.

Another object of my invention is to provide a combination of ingredients, which when mixed with a considerably larger quantity of flour and combined with water and the other ordinary dough-forming ingredients, shall be capable of producing a dough requiring a relatively shorter fermentation period than has hitherto been necessary, and that under materially lower temperature conditions than has been permissible.

In carrying out my invention I intimately mix flour, dextrose sugar and gelatinized starch in the proportion of 6 parts of flour, 3 parts of dextrose and 1½ parts of gelatinized starch, the two latter being in finely divided or pulverized form. In using this combination of ingredients, 10½ pounds thereof is mixed with 196 pounds of flour together with the other ordinary ingredients in the proportions required for the manufacture of bread or whatever fermented dough is being prepared and the resulting dough is made into bread in the well known manner. I have found that the above noted mixture or combination does not deteriorate with age, is inexpensive to make, permits the use of one-third less of the amount of yeast ordinarily employed in fermented doughs, and is exceedingly effective in increasing the activity of fermentation as well as the amount of water which will be taken up by a given weight of flour without causing slackening in the preparation of dough. Moreover, it makes possible the carrying on of the fermentation of the dough at relatively low temperature, and even under these conditions, the time necessary for the complete fermentation is materially less than that ordinarily required. The bread formed from dough made with the mixture of my invention will remain in a crisp, fresh, and palatable condition for long periods of time without getting stale, and I have found that it occupies a relatively larger volume than would ordinarily be the case with the same quantity of flour as commonly treated.

While I preferably employ the ingredients going to make up my compound in the proportions noted, it is to be understood that without departing from my invention the various quantities of said ingredients may be considerably varied.

It will be noted that while under ordinary conditions I may and usually do dispose of my mixture in the proportions above noted, in some instances I may combine the dextrose and gelatinized starch with the contents of a barrel of flour of the ordinary weight, placing the same on the market as a processed compound flour. In such case, therefore, the proportions of the ingredients would be approximately 191½ pounds of flour, 3 pounds of dextrose and 1½ pounds of gelatinized starch. It is to be further noted that the above noted proportions of materials used in one barrel of flour is in full accordance with the proportions indicated in the formula for the so-called baker's mixture.

I claim:

1. A substance for use in the manufacture of dough consisting of an intimate mixture of flour, dextrose and gelatinized starch.

2. A substance for use in the manufacture of dough consisting of an intimate mixture of 6 parts of flour, 3 parts of dextrose and 1½ parts of gelatinized starch.

Dated, New York city, October 5th, 1916.

THOMAS G. BLACKLOCK.

Witnesses:
    G. H. TUPBEY,
    A. KELLEY.